(12) United States Patent
Cottron et al.

(10) Patent No.: US 11,726,171 B2
(45) Date of Patent: Aug. 15, 2023

(54) PROCESSING METHOD FOR COHERENT MIMO RADAR USING DDMA WAVEFORMS

(71) Applicant: THALES, Courbevoie (FR)

(72) Inventors: Rodolphe Cottron, Mérignac (FR); Pascal Cornic, Guilers (FR); Yoan Veyrac, Mérignac (FR)

(73) Assignee: THALES, Courbevoie (FR)

( * ) Notice: Subject to any disclaimer, the term of this patent is extended or adjusted under 35 U.S.C. 154(b) by 181 days.

(21) Appl. No.: 17/084,495

(22) Filed: Oct. 29, 2020

(65) Prior Publication Data

US 2021/0132187 A1 May 6, 2021

(30) Foreign Application Priority Data

Oct. 31, 2019 (FR) ...................................... 1912182

(51) Int. Cl.
*G01S 7/288* (2006.01)
*G01S 13/58* (2006.01)
*G01S 13/91* (2006.01)

(52) U.S. Cl.
CPC ............ *G01S 7/288* (2013.01); *G01S 13/582* (2013.01); *G01S 7/2883* (2021.05); *G01S 13/913* (2013.01)

(58) Field of Classification Search
None
See application file for complete search history.

(56) References Cited

U.S. PATENT DOCUMENTS

2011/0267223 A1* 11/2011 Jin .................. G01S 7/2923
342/137

OTHER PUBLICATIONS

Kantor, et al., "Airborne GMTI using MIMO techniques", Technical Report 1150, Lincoln Laboratory, 2011.
Nouvel, et al., "Airborne MIMO investigation for STAP-GMTI applications", RADAR 2019, Sep. 2019.

* cited by examiner

*Primary Examiner* — Whitney Moore
(74) *Attorney, Agent, or Firm* — BakerHostetler (57) ABSTRACT

A method for processing coherent MIMO radar processing DDMA waveforms includes: generating waveforms on transmitters, the waveforms, modulo the pulse repetition frequency, being identical from one transmitter to the next, to within a phase ramp specific to each transmit path; generating, for at least one receiver, a Range-Doppler representation of echoes of transmitted waveforms, where, for each receiver, echoes of a transmitter occupy at least one frequency cell in the Doppler spectrum, each signal band specific to a transmitter, placement of the signal bands in the Doppler spectrum being determined by phase ramp applied to each transmitter, the waveforms generated to leave a portion of Doppler spectrum between two signal bands unoccupied; identifying the transmitter corresponding to each signal band, due to Range-Doppler representation of echoes of transmitted waveforms. The method is suitable for the millimetre band, automotive or aircraft radar, for detection of target relative to the carrier.

15 Claims, 5 Drawing Sheets

PROCESSING METHOD FOR COHERENT MIMO RADAR USING DDMA WAVEFORMS

CROSS-REFERENCE TO RELATED APPLICATIONS

This application claims priority to foreign French patent application No. FR 1912182, filed on Oct. 31, 2019, the disclosure of which is incorporated by reference in its entirety.

FIELD OF THE INVENTION

The field of the invention is that of MIMO ("multiple input, multiple output") radar with a DDMA (Doppler Division Multiple Access) waveform. The invention is particularly suitable for millimetre radar, in particular radar operating in the W band (frequency between 75 and 110 GHz). The invention may be applied, non-exclusively, to airborne radar, in particular for landing assistance.

BACKGROUND

MIMO radar makes it possible to improve the detection performance of radar in a certain number of applications, in particular airborne radar, by providing in particular better angular resolution, and better Doppler resolution. A MIMO radar consists of a plurality of receivers and also of a plurality of transmitters. Two types of MIMO radar are usually distinguished: multistatic MIMO radar and coherent MIMO radar. In multistatic MIMO radar, not all of the transmitters and/or receivers are located at the same area, or on the same carrier. In coherent MIMO radar, the transmitters and receivers are all co-located on the carrier: this is then referred to as coherent MIMO radar. In the present invention, it is assumed that the radar is coherent.

The DDMA waveform, used in the MIMO radar, is particularly advantageous, since it exhibits good orthogonality, and therefore good isolation, between the channels. Specifically, the signals transmitted over each of the transmit antennas are identical, with the exception that the centre frequencies of the signals transmitted by the various transmit antennas are slightly shifted with respect to one another, so that these signals can be separated in the Doppler domain. Thus, each of the waveforms is generated by applying a different phase modulation between each transmit channel.

Next, the received signals are processed by a set of matched filters, each filter being matched to a waveform, and isolating each transmit channel.

Figure 1:
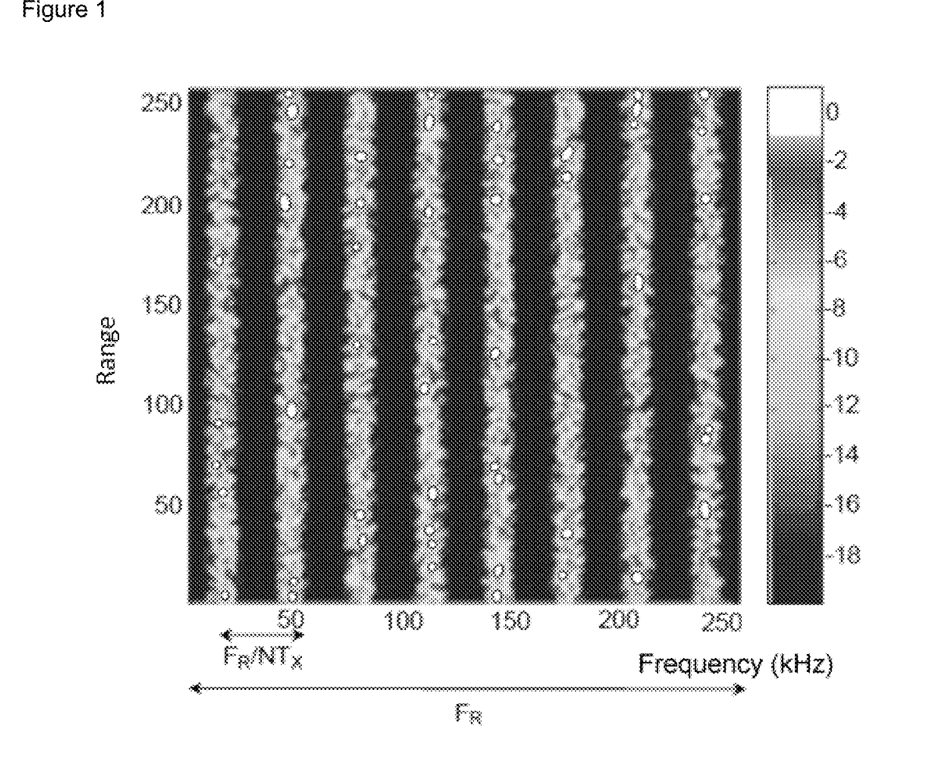
FIG. 1, described above, shows a DDMA waveform according to the prior art.

FIG. 1 illustrates the representation of the signals received over one particular receiver, where each signal band (vertical in the direction of the figure) corresponds to the echoes of fixed or moving targets of each of the transmitters, after Doppler processing. In FIG. 1, the radar comprises $NT_X=8$ transmitters, and each transmitter is shifted, in FIG. 1, by $F_R/NT_X$, where $F_R$ is the pulse repetition frequency.

The signals received through all of the receivers, and transmitted through all of the transmitters, are next combined in order to perform DBF (digital beamforming) processing. It is recalled that, to perform DBF processing, it is sought to optimize the transmit/receive relationship, on each transmit path/receive path pair, by distributing the power over the transmit antennas so as to obtain maximum energy in a given direction.

To perform DBF processing, it is however essential to identify to which transmitter each received signal band corresponds. The difference between the bands of received signals is known because it is related to the phase law of the DDMA waveform, but the absolute positioning of these bands remains to be determined, namely to which transmitter at least one of the received signal bands corresponds. The other transmitters may then be deduced by virtue of knowing the phase shift of each transmitter.

Taking the transmitter having a zero phase ramp as a reference, the received signal band is centred on the Doppler frequency related to the aiming direction and speed of the radar. This Doppler frequency therefore has to be known with sufficient precision so as not to confuse the various bands.

Figure 2:
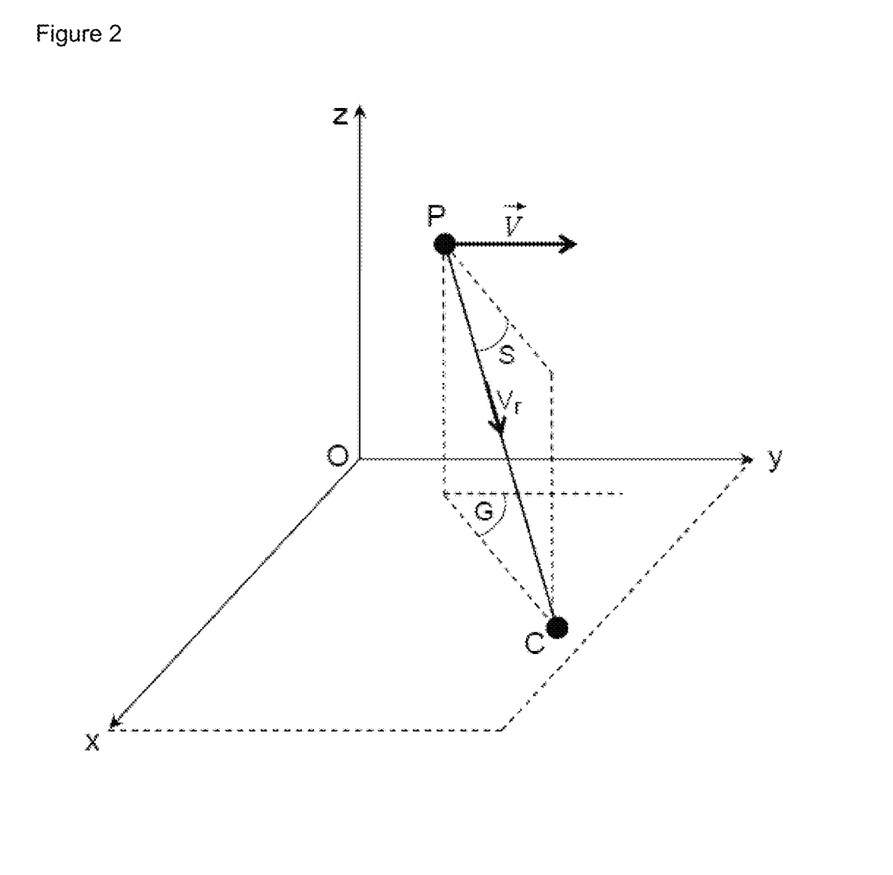
FIG. 2, described above, shows the carrier vector of the radar, with respect to a target.

FIG. 2 illustrates a vector $\vec{V}$ representing the movement of the carrier/radar, and the aiming axis of the radar in the direction of the target C.

As is known, the value of the Doppler frequency $f_D$ is:

$$f_D = \frac{2}{\lambda} \cdot V \cdot \cos S \cdot \cos G = \frac{2 \cdot Vr}{\lambda},$$

where V is the speed of the radar, S and G are the aiming elevation and bearing, respectively, $\lambda$ is the wavelength of the radar, and $V_R$ is the relative radial velocity of the radar with respect to the target, which corresponds to the projection of the speed of the radar onto the aiming axis.

The selection of the samples associated with the transmitter having the zero phase ramp thus depends on knowing $V_R$ with increasing precision as the frequency resolution $c_F$ and wavelength of the pulses decrease. Knowing $V_R$ is even more important when the speed of the radar is unclear, due to aliasing in the Doppler domain.

For example, if the value of the frequency resolution is $c_F=10$ Hz, and the frequency of the radar is $F_E=3$ GHz (S band, $=0.1$ m); to know the positioning of the signal to within a cell, the precision of $V_R$ is $\lambda/2*c_F=0.5$ m/s, which is relatively achievable using a conventional inertial measurement unit or using GPS.

Under the same conditions, for X-band radar ($F_E=10$ GHz, $=3$ cm), the precision of $V_R$ becomes $\lambda/2*c_F=0.15$ m/s=15 cm/s, which requires a high-quality inertial measurement unit.

Now, still under the same conditions, for millimetre radar (W band between 75 and 110 GHz), the precision of $V_R$ becomes about 1 cm/s, which requires an inertial measurement unit of very high precision which is not always compatible with low-cost systems.

The article "*Airborne GMTI using MIMO techniques*" (J. Kantor & S. K. Davis, 2011, Technical Report 1150, Lincoln Laboratory) describes a MIMO system with a DDMA waveform. In this article, no mention is made of the method for selecting the samples from the various transmitters, but since the radar used is S-band radar, as mentioned above, the required precision for the speed of the carrier is not an issue.

SUMMARY OF THE INVENTION

The object of this invention is to propose a system which not only does not require a high degree of precision regarding knowledge of the relative radial velocity of the radar with respect to target, but makes it possible to do without it entirely.

One subject of the invention is therefore a method for processing coherent MIMO radar processing DDMA waveforms and comprising $NT_X$ transmitters and $NR_X$ receivers, comprising the steps of a) generating waveforms on at most $NT_X$ transmitters, the waveforms, modulo the pulse repetition frequency $F_R$, being identical from one transmitter to the next, to within a phase ramp specific to each transmitter;

b) generating, for at least one receiver, a Range-Doppler representation of the echoes of the transmitted waveforms, where, for each receiver, the echoes of a transmitter over a plurality of range cells occupy at least one frequency cell in the Doppler spectrum, called signal band, each signal band being specific to one of the transmitters, the placement of the signal bands in the Doppler spectrum being determined according to the phase ramp applied to each transmitter, the waveforms being generated so as to leave a portion of the Doppler spectrum between two signal bands unoccupied;

c) identifying the transmitter corresponding to each signal band, on the basis of the Range-Doppler representation of the echoes of the transmitted waveforms.

Advantageously, step c) comprises the sub-steps of:
calculating a signal referred to as an echo signal obtained by summing the power of the echoes of each signal band over all of the range cells;
generating a signal referred to as a pattern signal, over the same number of frequency cells as the Range-Doppler representation of the echoes of the transmitted waveforms, the transmitters being numbered in ascending order according to the phase ramp applied to the transmitter, the pattern signal being generated such that the transmitters are sorted, according to the ascending order, while taking into account the unoccupied portion of the Doppler spectrum;
calculating a cross-correlation signal between the echo signal and the pattern signal;
identifying the transmitter corresponding to each signal band on the basis of the maximum of the cross-correlation signal.

Advantageously, in the identification step, the position of the maximum of the cross-correlation signal corresponds to the echoes of the first transmitter in the Doppler spectrum, the first transmitter being defined as being that for which the phase ramp is zero.

Advantageously, the unoccupied portion of the Doppler spectrum is obtained by switching off one of the $NT_X$ transmitter, the pattern signal being non-zero for each frequency cell $k*F_R/NT_X$, where $k=\{0, \ldots, NT_X-1\}$, and zero in the other frequency cells.

Advantageously, the unoccupied portion of the Doppler spectrum is obtained by determining the phase ramps such that the signal bands are spaced apart by $F_R/NT_{X2}$ frequency cells in the Doppler spectrum, where $NT_{X2}$ is an integer such that $NT_{X2}>NT_X$, the pattern signal being non-zero for each frequency cell $k*F_R/NT_{X2}$, for $k=\{0, \ldots, NT_X-1\}$, and zero in the other frequency cells.

Advantageously, the Range-Doppler representation of the echoes is obtained by means of a Fast Fourier Transform (FFT) on a plurality of acquisition points, the number of acquisition points being supplemented by adding zeros in order to obtain $N_{FFT}$ points in total, $N_{FFT}$ being determined such that it is an integer multiple of the number of transmit paths $NT_X$, if $NT_X$ is not a power of two.

Advantageously, the Range-Doppler representation of the echoes is obtained by means of a Fast Fourier Transform (FFT) on pulse sequences coded over a coherent processing interval (CPI), the number of pulses per coherent processing interval (CPI) being adjusted so as to make it a multiple of the number of transmitters.

Another subject of the invention is a method for processing coherent MIMO radar using DDMA waveforms and comprising $NT_X$ transmitters and $NR_X$ receivers, comprising the steps of:

a) generating waveforms on at most $NT_X$ transmitters, the waveforms, modulo the pulse repetition frequency $F_R$, being identical from one transmitter to the next, to within a phase ramp specific to each transmitter;

b) generating, for at least one receiver, a Range-Doppler representation of the echoes of the transmitted waveforms, where, for each receiver, the echoes of a transmitter over a plurality of range cells occupy at least one frequency cell in the Doppler spectrum, called signal band, each signal band being specific to one of the transmitters, the placement of the signal bands in the Doppler spectrum being determined according to the phase ramp applied to each transmitter, the waveforms being generated such that the spacing between at least two consecutive signal bands is different from the spacing between the other consecutive signal bands;

c) identifying the transmitter corresponding to each signal band, on the basis of the Range-Doppler representation of the echoes of the transmitted waveforms.

Advantageously, the spacings between two consecutive signal bands are all different.

Advantageously, the signal bands are spaced apart according to a predetermined spacing law.

Advantageously, the spacing between each of the signal bands is determined such that the average of the spacings is equal to $F_R/NT_X$.

Advantageously, the Range-Doppler representation of the echoes is obtained by means of a fast Fourier transform (FFT) on a plurality of acquisition points, the number of acquisition points being supplemented by adding zeros in order to obtain $N_{FFT}$ points in total, $N_{FFT}$ being determined such that the spacing between two consecutive bands is an integer multiple of $F_R/N_{FFT}$.

Advantageously, the Range-Doppler representation of the echoes is obtained by means of a fast Fourier transform (FFT) on pulse sequences coded over a coherent processing interval (CPI), the number of pulses $N_{REC}$ per coherent processing interval (CPI) being determined such that the spacing between two consecutive bands is an integer multiple of $F_R/N_{REC}$.

Advantageously, the method comprises an additional step of digital forming processing, in which the waveforms are combined, in a weighted manner, with the echoes from the various receivers.

Another subject of the invention is a MIMO radar that is able to implement the aforementioned method.

BRIEF DESCRIPTION OF THE DRAWINGS

Other features, details and advantages of the invention will become apparent upon reading the description provided with reference to the appended drawings, which are given by way of example and in which, respectively.

DETAILED DESCRIPTION

According to the first and second embodiments of the invention, the method comprises three steps.

In a first step, the radar, which comprises $NT_X$ transmitters, generates waveforms on at most $NT_X$ transmitters. According to a first embodiment, described in detail below, one of the $NT_X$ transmitter is switched off. According to the second embodiment, also described in detail below, all of the transmitters are activated. The principle of the DDMA waveform, as explained above, consists in transmitting, in each pulse repetition interval, radar pulses that are identical from one transmitter to the next, to within a phase ramp specific to each transmitter. The phase ramp is created by a phase-shifter, which is a relatively straightforward component to integrate. Next, each of the received echoes is processed by a matched filter bank, namely one filter per waveform.

The processing method according to the invention may be implemented at the level of one of the receiver, or of a plurality thereof, or even of all of them. Application to digital beamforming specifically requires associating all of the receivers with the transmitters, but this application is not limiting. In general, the method according to the invention makes it possible, in a MIMO context, to associate, even for just one receiver, each signal band with one of the transmitters.

For this, in the second step b), a Range-Doppler representation of the echoes of the transmitted waveforms is generated. As illustrated by FIG. 1, described above, the Range-Doppler representation comprises the frequency cells (or the number of FFT, fast Fourier transform, points), on the abscissa and the range cells on the ordinate. Each signal band is centred on the frequency cell of the Doppler shift of each transmitter. The signal bands are thus spaced apart by $F_R/NT_X$, where $F_R$ is the pulse repetition frequency (inverse of the pulse repetition interval).

Because of the very nature of the DDMA waveform, which introduces a phase shift for each of the transmitter, this phase shift can be found in the Doppler spectrum, in the spacing of the signal bands. Each of the received echoes is processed by a matched filter bank, namely one filter per waveform. On reception, the processor of the MIMO radar removes the phase shift which was applied on transmission.

The particularity of the method according to the invention is that the waveforms are generated such that a portion of the Doppler spectrum is left unoccupied between two signal bands. For a DDMA MIMO radar of the prior art, the phase shifts applied are determined such that the signal bands are all uniformly distributed in the Doppler spectrum. However, by leaving a portion of the spectrum unoccupied, identification of the transmitter corresponding to each of the signal bands is facilitated, as demonstrated below (step c) of the method).

Advantageously, step c) of the processing method comprises a first sub-step of calculating a signal referred to as an echo signal. The echo signal is obtained by summing, for each signal band, the power of the echoes over all of the range cells. Thus, a signal representative of the energy per signal band is obtained. The echo signal is thus obtained directly and easily (namely without computational complexity) from the Range-Doppler representation.

Next, in a second sub-step, a signal referred to as a pattern signal is generated over the same number of frequency cells as the Range-Doppler representation of the echoes of the transmitted waveforms. The pattern signal is a representation, in the order of the transmitters, of the shift caused by the phase ramp applied to each transmitter. Thus, in the MIMO radar, the phase ramp which is applied is associated with each transmitter. Next, a number is assigned to the transmitter: no 1 for the transmitter that has a zero phase ramp, no 2 for the first phase ramp, and so on. Thus, a number from 1 to $NT_X$ is assigned to each transmitter. The pattern signal is a binary signal, the value of which is 1 (or any other value other than zero, as long as this value is the same for all of the transmitters) for each frequency cell corresponding to the shift caused by the slope of the various phase laws and 0 elsewhere. Additionally, the pattern signal is also set to 0 in the unoccupied portion of the Doppler spectrum.

A cross-correlation signal between the echo signal and the pattern signal is then calculated. The cross-correlation signal corresponds to the cross-correlation function between the echo signal and the pattern signal. Each of the two signals may be considered as being a "comb"-type signal. The cross-correlation signal is maximum when the two combs encounter one another.

The position of the maximum of the cross-correlation signal indicates the position, in the Doppler spectrum, of the first transmitter. The position of the other transmitters is deduced by shifting according to the theoretical spacing between the signal bands, modulo the pulse repetition frequency, or modulo the number of FFT points.

The processing described is performed systematically, on each burst of the radar signal.

Figure 3:
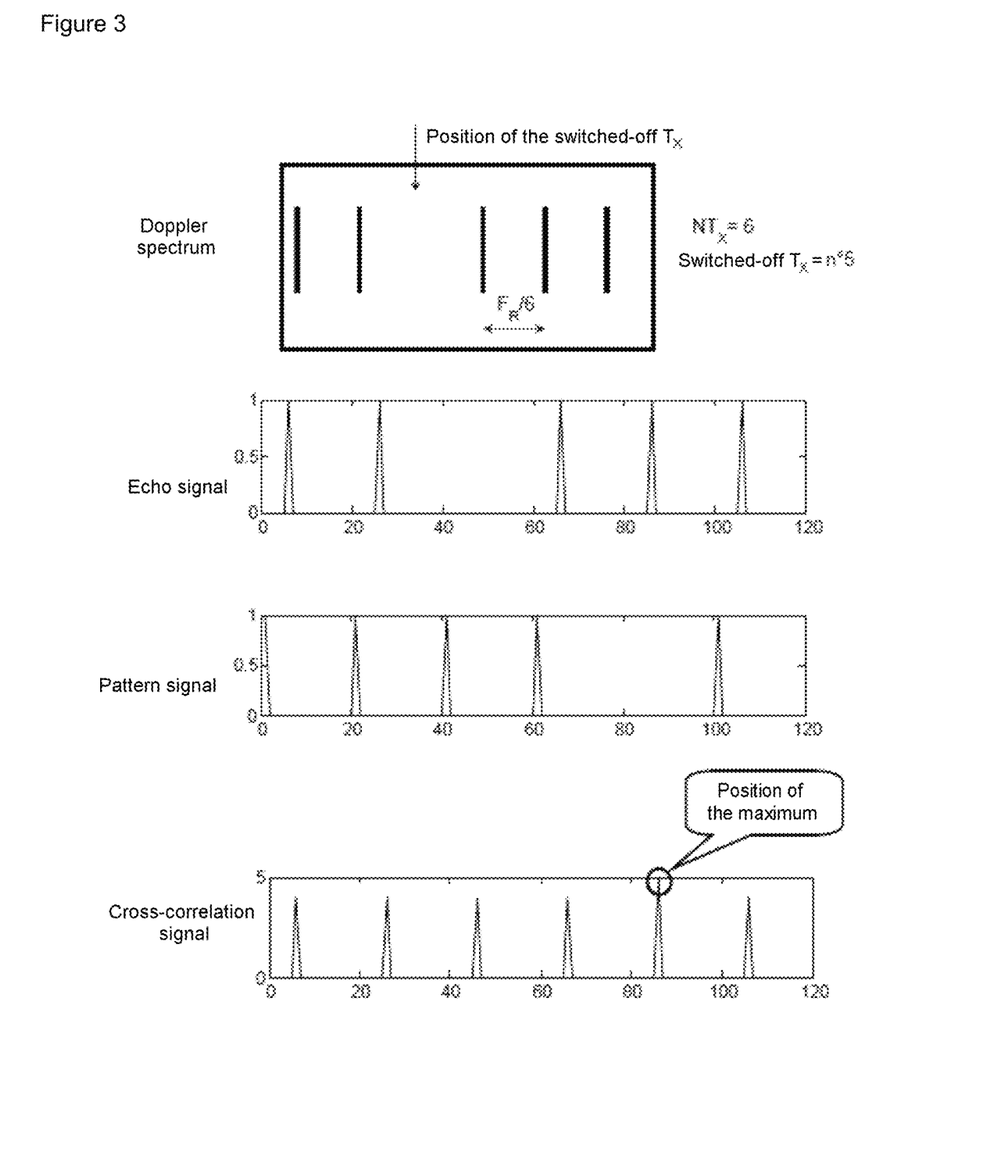
FIG. 3 shows the diagrams illustrating the MIMO radar processing method according to a first embodiment of the invention, in which one of the transmitter is switched off.

FIG. 3 illustrates a first embodiment of the processing method according to the invention. According to the first embodiment, the portion of the spectrum that is unoccupied is produced by switching off one of the transmitter. Specifically, MIMO radar generally has lots of transmitters, for example ten or so, and switching off one of the transmitter affects the radar picture only by ten or so percent, in the case that the radar comprises ten transmitters.

In the example of FIG. 3, the MIMO radar has $NT_X=6$ transmitters, and the fifth transmitter is switched off.

The switching off of one of the transmitter may be performed in various ways. For example, amplitude control, used in active antennas of radar for amplitude and phase control, may apply a zero amplitude to the transmitter to be switched off. This solution has the advantage of being able to be reconfigured on mission, by modifying the amplitude control command. As an alternative, the output of the power transmitters of the transmitter to be reached is not connected, which constitutes a permanent solution, and one which can be modified only between two missions. Another possibility would be to add a controlled switch upstream of each power transmitter.

The choice of the transmitter to be switched off may be completely random, when the number of the transmitter that is switched off is known. The choice of path has no effect on the outcome of the process.

The echo signal is obtained by summing the powers of each range cell for each signal band. In the Doppler spectrum, all of the echoes of the transmitters are spaced apart by $F_R/NT_X$, except, by definition, in the band where the transmitter has been switched off. In FIG. 3, the echoes are received over 120 FFT points, without this value limiting the scope of the present invention.

The pattern signal is represented over the same number of frequency cells as the Doppler spectrum of the received echoes. The pattern signal is non-zero (it has a value of 1 for example) for each frequency cell $k*F_R/NT_X$, where $k=\{0, \ldots, NT_X-1\}$, corresponding to a signal band, with the exception of the signal band of the switched-off transmitter. The pattern signal is also zero in the other frequency cells. In the example of FIG. 3, the fifth transmitter (from among the six transmitters) is switched off. Thus, the pattern signal is a comb that has a value other than 0 in the 0, $F_R/6$, $2*F_R/6$, $3*F_R/6$ and $5*F_R/6$ cells, and zero elsewhere.

Lastly, the cross-correlation signal between the echo signal and the pattern signal is calculated. In FIG. 3, the cross-correlation signal, which should be read in conjunction with the Doppler spectrum of the received echoes, is maximum at a position corresponding, in the Doppler spectrum, to the signal band of the first transmitter (namely the second signal band from the right of the spectrum in the example of FIG. 3). Thus, the second signal band from the right corresponds to the echoes from the first transmitter. Next, the position of the other transmitters may be deduced by simply shifting from left to right, circularly, in relation to the phase ramp. In the example of FIG. 3, the first signal band from the right corresponds to the echoes of the second transmitter, the first band on the left corresponds to the echoes of the third transmitter, and so on.

Thus, the signals from each of the transmitters is associated in the Doppler spectrum, without using information on the radial velocity of the carrier, which corresponds to the projection of the speed of the carrier onto the aiming axis.

The first embodiment described above is particularly suitable for DDMA MIMO radar having a high number of transmitters, ten or so for example. Thus, the radar efficiency is affected little by the switching off of one transmitter.

Switching off one of the transmitter may however prove to be detrimental from the point of view of radar efficiency when the MIMO radar has few transmitters. For example, if the MIMO radar comprises only four transmitters, switching off one of the transmitter affects the radar picture by about 25%, which does not represent optimal use of the radar.

Figure 4:
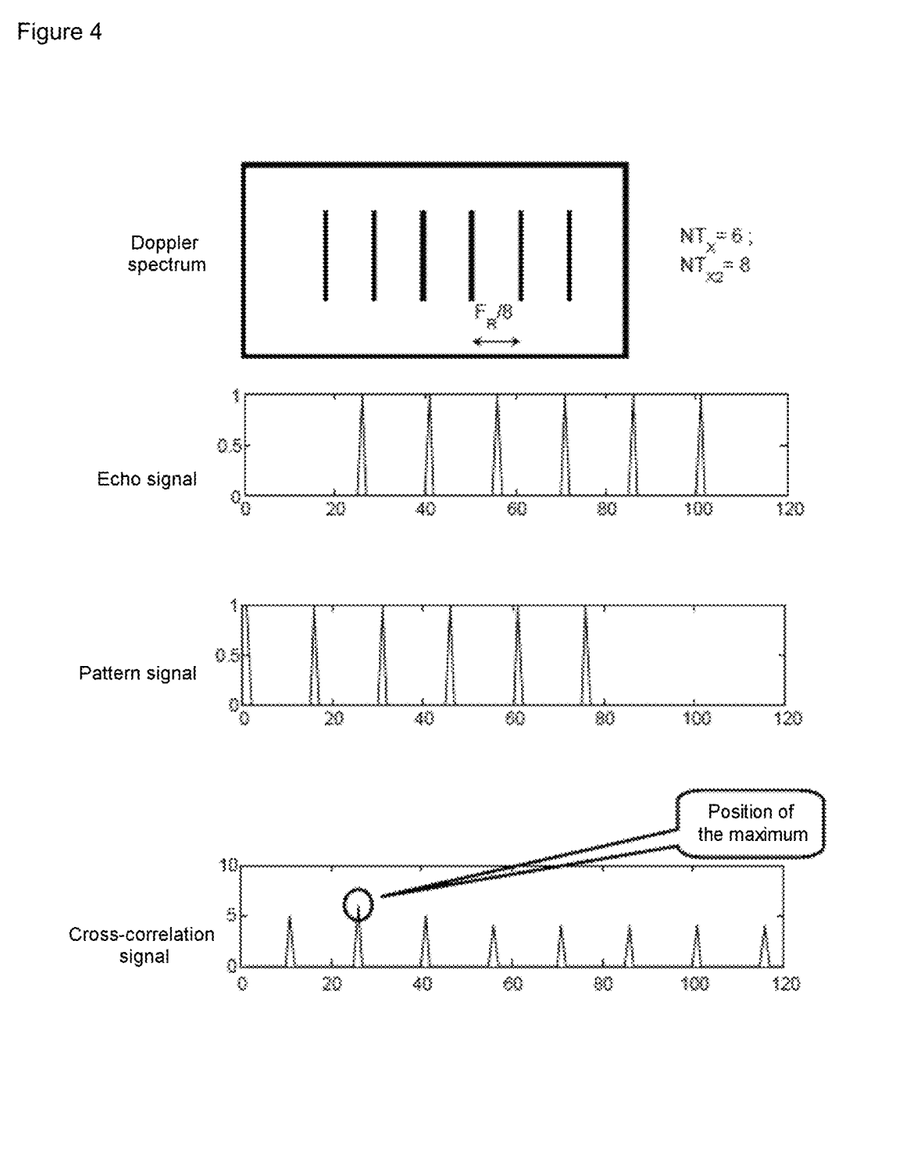
FIG. 4 shows the diagrams illustrating the MIMO radar processing method according to a second embodiment of the invention, in which the spacing between the bands is modified.

The second embodiment of the processing method according to the invention also makes it possible to associate the transmitters with each of the signal bands. For this, the phase ramps are generated such that the signal bands are spaced apart by $F_R/NT_{X2}$ frequency cells in the Doppler spectrum, where $NT_{X2}$ is an integer such that $NT_{X2} > NT_X$. For example, $NT_{X2} = NT_X + 1$. In the example of FIG. 4, $NT_{X2} = NT_X + 2$, with $NT_X = 6$ and $NT_{X2} = 8$.

The spacing thus generated also creates an empty space in the Doppler space, like for the first embodiment. The Doppler spectrum illustrated in FIG. 4 shows six signal bands spaced apart by $F_R/8$ in the Range-Doppler representation of the echoes of the transmitted waveforms.

Like for the first embodiment, an echo signal is created. In the second embodiment, the value of the echo signal is the sum of the powers of the echoes received over all of the range cells of a signal band. The echo signal therefore has $NT_X$ positive values, spaced apart by $F_R/NT_{X2}$, over $N_{FFT}$ frequency cells.

Additionally, the pattern signal is non-zero (it has a value of 1 for example) for each frequency cell $k*F_R/NT_{X2}$, for $k=\{0, \ldots, NT_X-1\}$, and zero in the other frequency cells. The pattern signal is represented over the same number of frequency cells as the Doppler spectrum of the received echoes. In the example of FIG. 4, the pattern signal takes the value "1" for 0 on the abscissa, and for each frequency cell spaced apart by $F_R/NT_{X2}$, and the value "0" elsewhere.

The cross-correlation signal corresponds to the cross-correlation function between the echo signal and the pattern signal. Its maximum indicates the first transmitter, namely that for which the phase ramp applied on transmission is zero.

In the example of FIG. 4, by superposing the cross-correlation signal and the Doppler spectrum, it can be seen that the maximum of the cross-correlation signal corresponds to the leftmost signal band in the Doppler spectrum. The second leftmost band corresponds to the second transmitter path, and so on. Like for the first embodiment, the empty space created in the Doppler spectrum makes it possible to identify the relative positioning of the signals, namely which transmitter they are from, without knowing the radial velocity of the carrier with respect to the target.

The spacing, although uniform, between the DDMA signal bands (having a value of $F_R/NT_X$ or $F_R/NT_{X2}$, according to the first or second embodiment), is not always equal to a whole number of frequency cells. This situation arises if $NT_X$ or $NT_{X2}$ (according to the second embodiment) is not a power of two, while the number of points on which the FFT is performed is generally a power of two. In this case, one option would be to take the closest frequency cell, but one and the same echo from various transmitters would be sampled differently from one signal band to the next, which would introduce unwanted amplitude modulation, and therefore a worse DBF result. The other solution would be to interpolate the signals so as to put the signals onto a sampling grid common to the various DDMA channels, or equivalently, to perform an inverse Fourier transform, numerically apply the phase ramp opposite that used on transmission and then redo the direct Fourier transform so as to select the samples around the zero frequency cell. All of these operations result in obtaining defect-free DBF, but at the cost of high computational complexity.

To overcome this, it is proposed to supplement the number of acquisition points by adding zeros in the time domain (the "zero padding" technique), until the number of FFT points $N_{FFT}$ is an integer multiple of the number of transmitters $NT_X$.

For example, if there are $NT_X=12$ transmitters and $N_{REC}=512$ points on which FFT is initially envisaged (it is recalled that $T_E=1/c_F=N_{REC}/F_R$), an FFT of size $N_{FFT}=540$ must be performed, which is a multiple of $NT_X=12$.

As an alternative, the number of pulses per coherent processing interval (CPI) is adjusted to make it a multiple of the number of transmitters.

For example, with $NT_X=12$, instead of using $N_{REC}=512$, $N_{REC}=480$ or $N_{REC}=540$ will be taken, which makes it possible to perform an FFT without zero padding while remaining a multiple of $NT_X$.

Figure 5:
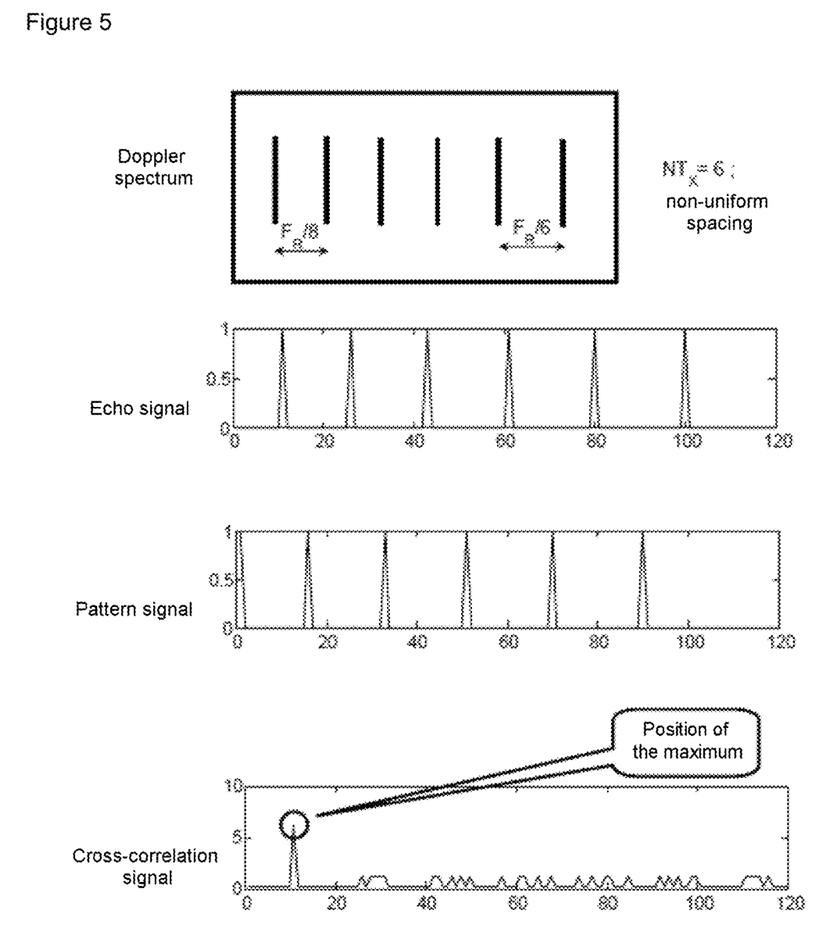
FIG. 5 shows the diagrams illustrating the MIMO radar processing method according to a third embodiment of the invention, in which the spacing between the bands is non-uniform.

FIG. 5 illustrates a third embodiment of the invention.

Step a) of the method according to the third embodiment of the invention is identical to step a) of the first two embodiments.

In step b), a Range-Doppler representation of the echoes of the transmitted waveforms is generated for at least one receive path. For each receiver, the echoes of a transmitter over a plurality of range cells occupy at least one frequency cell in the Doppler spectrum (signal band). Each signal band is specific to one of the transmitter. The placement of the signal bands in the Doppler spectrum is determined according to the phase ramp applied to each transmitter. What more particularly characterizes the third embodiment is the spacing between each of the signal bands: the spacing between each of the signal bands is non-uniform: there are at least two signal bands whose spacing (between these two bands)

is different from the spacing between the other signal bands. In particular, all of the spacings between two consecutive signal bands are different, but this is not a required condition. This non-uniform spacing makes it possible to easily identify to which transmitter the echoes correspond, without it being necessary to switch off one of the transmitters. This embodiment therefore does not affect the radar efficiency.

The third embodiment comprises a third step c) of identifying the transmitter corresponding to each signal band, on the basis of the Range-Doppler representation of the echoes of the transmitted waveforms. This step is identical to step c) of the first two embodiments.

The Doppler spectrum illustrated in FIG. 5 shows six signal bands, the spacing of which is non-uniform in the Range-Doppler representation of the echoes of the transmitted waveforms. In FIG. 5, the spacing varies from $F_R/8$ to $F_R/6$; these values are given only by way of example.

In the third embodiment, the value of the echo signal is the sum of the powers of the echoes received over all of the range cells of a signal band. The echo signal therefore has $NT_X$ positive values.

Additionally, the pattern signal is non-zero (it has a value of 1 for example) for each frequency cell $f(k)*F_R/NT_X$, for $k=\{0, \ldots, NT_X-1\}$, and zero in the other frequency cells, and $f( )$ is a function representative of the non-uniform spacing. The function $f( )$ may therefore define a spacing law. For example, the spacing law may be linear or logarithmic. The pattern signal is represented over the same number of frequency cells as the Doppler spectrum of the received echoes.

Advantageously, a spacing between each of the signal bands is determined such that the average of the spacings is equal to $F_R/NT_X$.

The cross-correlation signal corresponds to the cross-correlation function between the echo signal and the pattern signal. Its maximum indicates the first transmitter, namely that for which the phase ramp applied on transmission is zero.

In the example of FIG. 5, by superposing the cross-correlation signal and the Doppler spectrum, it can be seen that the maximum of the cross-correlation signal corresponds to the leftmost signal band in the Doppler spectrum. The second leftmost band corresponds to the second transmitter, and so on.

Like for the first two embodiments, it is also possible to supplement the number of FFT acquisition points by adding zeros ("zero padding") up to $N_{FFT}$ points, or to adjust the number of pulses $N_{REC}$ per coherent processing interval (CPI). In this third embodiment with non-uniform spacing, le number of FFT points $N_{FFT}$, or, respectively, the number of pulses $N_{REC}$, should be such that the frequency difference between two consecutive bands, related to the phase ramps of the DDMA modulation, is a whole number of frequency cells, i.e. integer multiple of $F_R/N_{FFT}$ or of $F_R/N_{REC}$, respectively.

The method according to the invention is particularly suitable for the millimetre band (W band), for automotive radar applications or applications of radar on board aeroplanes or drones, for the detection of fixed or moving target relative to the carrier.

The invention claimed is:

1. A method for processing coherent MIMO radar processing DDMA waveforms and comprising $NT_X$ transmitters and $NR_X$ receivers, comprising the steps:
   a) generating waveforms one or more of the $NT_X$ transmitters, the waveforms, modulo the pulse repetition frequency $F_R$, being identical from one transmitter to the next, to within a phase ramp specific to each transmitter;
   b) generating, for at least one receiver, a range-Doppler representation of the echoes of the transmitted waveforms, where, for each receiver, the echoes of a transmitter over a plurality of range cells occupy at least one frequency cell in the Doppler spectrum, called signal band, each signal band being specific to one of the transmitters, the placement of the signal bands in the Doppler spectrum being determined according to the phase ramp applied to each transmitter, the waveforms being generated so as to leave a portion of the Doppler spectrum between two signal bands unoccupied;
   c) identifying the transmitter corresponding to each signal band, on the basis of the Range-Doppler representation of the echoes of the transmitted waveforms.

2. The method according to claim 1, wherein step c) comprises the sub-steps of:
   calculating a signal referred to as an echo signal obtained by summing the power of the echoes of each signal band over all of the range cells;
   generating a signal referred to as a pattern signal, over the same number of frequency cells as the Range-Doppler representation of the echoes of the transmitted waveforms, the transmitters being numbered in ascending order according to the phase ramp applied to the transmitter, the pattern signal being generated such that the transmitter are sorted, according to the ascending order, while taking into account the unoccupied portion of the Doppler spectrum;
   calculating a cross-correlation signal between the echo signal and the pattern signal;
   identifying the transmitter corresponding to each signal band on the basis of the maximum of the cross-correlation signal.

3. The method according to claim 2, wherein, in the identification step, the position of the maximum of the cross-correlation signal corresponds to the echoes of the first transmitter in the Doppler spectrum, the first transmitter being defined as being that for which the phase ramp is zero.

4. The method according to claim 2, wherein the unoccupied portion of the Doppler spectrum is obtained by switching off one of the $NT_X$ transmitters, the pattern signal being non-zero for each frequency cell $k*Fi/NT_X$, where $k=\{0, \ldots, NT_X-1\}$, and zero in the other frequency cells.

5. The method according to claim 2, wherein the unoccupied portion of the Doppler spectrum is obtained by determining the phase ramps such that the signal bands are spaced apart by $F_R/NT_{x2}$ frequency cells in the Doppler spectrum, where $NT_{x2}$ is an integer such that $NT_{x2}>NT_X$, the pattern signal being non-zero for each frequency cell $k*F_R/NT_{x2}$, for $k=\{0, \ldots, NT_X-1\}$, and zero in the other frequency cells.

6. The method according to claim 1, wherein the Range-Doppler representation of the echoes is obtained by means of a fast Fourier transform (FFT) on a plurality of acquisition points, the number of acquisition points being supplemented by adding zeros in order to obtain $N_{FFT}$ points in total, $N_{FFT}$ being determined such that it is an integer multiple of the number of transmitters $NT_X$, if $NT_X$ is not a power of two.

7. The method according to claim 1, wherein the Range-Doppler representation of the echoes is obtained by means of a fast Fourier transform (FFT) on pulse sequences coded over a coherent processing interval (CPI), the number of pulses per coherent processing interval (CPI) being adjusted so as to make it a multiple of the number of transmitters.

8. The method according to claim 1, comprising an additional step of digital forming processing, in which the waveforms are combined, in a weighted manner, with the echoes from the various receivers.

9. A MIMO radar, configured to implement the method according to claim 1.

10. The method for processing coherent MIMO radar processing DDMA waveforms and comprising $NT_X$ transmitters and $NR_X$ receivers, comprising the steps of
   a) generating waveforms one or more of the $NT_X$ transmitters, the waveforms, modulo the pulse repetition frequency $F_R$ being identical from one transmitter to the next, to within a phase ramp specific to each transmitter;
   b) generating, for at least one receiver, a Range-Doppler representation of the echoes of the transmitted waveforms, where, for each receiver, the echoes of a transmitter over a plurality of range cells occupy at least one frequency cell in the Doppler spectrum, called signal band, each signal band being specific to one of the transmitters, the placement of the signal bands in the Doppler spectrum being determined according to the phase ramp applied to each transmitter, the waveforms being generated such that the spacing between at least two consecutive signal bands is different from the spacing between the other consecutive signal bands;
   c) identifying the transmitter corresponding to each signal band, on the basis of the Range-Doppler representation of the echoes of the transmitted waveforms.

11. The method according to claim 10, wherein the spacings between two consecutive signal bands are all different.

12. The method according to claim 10, wherein the signal bands are spaced apart according to a predetermined spacing law.

13. The method according to claim 10, wherein the spacing between each of the signal bands is determined such that the average of the spacings is equal to $F_R/NT_X$.

14. The method according to claim 10, wherein the Range-Doppler representation of the echoes is obtained by means of a fast Fourier transform (FFT) on a plurality of acquisition points, the number of acquisition points being supplemented by adding zeros in order to obtain $N_{FFT}$ points in total, $N_{FFT}$ being determined such that the spacing between two consecutive bands is an integer multiple of $F_R/N_{FFT}$.

15. The method according to claim 10, wherein the Range-Doppler representation of the echoes is obtained by means of a fast Fourier transform (FFT) on pulse sequences coded over a coherent processing interval (CPI), the number of pulses $N_{REC}$ per coherent processing interval (CPI) being determined such that the spacing between two consecutive bands is an integer multiple of $F_R/N_{REC}$.

* * * * *